United States Patent [19]

Ross et al.

[11] Patent Number: 5,114,453
[45] Date of Patent: May 19, 1992

[54] LIGHTWAVE GUIDE PRODUCED BY ION EXCHANGE OF CS+ IONS

[75] Inventors: Ludwig Ross, Klein-Winternheim; Werner Schumann, Mainz, both of Fed. Rep. of Germany

[73] Assignee: Schott Glaswerke, Mainz, Fed. Rep. of Germany

[21] Appl. No.: 618,606

[22] Filed: Nov. 27, 1990

Related U.S. Application Data

[60] Division of Ser. No. 437,295, Nov. 16, 1989, Pat. No. 5,004,707, which is a continuation of Ser. No. 267,651, Nov. 1, 1988, abandoned, which is a continuation of Ser. No. 821,435, Jan. 22, 1986, abandoned.

[30] Foreign Application Priority Data

Jan. 22, 1985 [DE] Fed. Rep. of Germany ....... 3501898
Jul. 10, 1985 [DE] Fed. Rep. of Germany ....... 3524605

[51] Int. Cl.$^5$ .................................................. C03C 25/02
[52] U.S. Cl. .................................. 65/30.13; 501/37; 385/124; 264/2.7; 65/3.14
[58] Field of Search ............... 65/3.14, 30.13; 501/37, 501/66; 264/1.5, 2.7; 350/96.31; 385/124

[56] References Cited

U.S. PATENT DOCUMENTS

| | | | |
|---|---|---|---|
| 3,607,322 | 9/1971 | Brady et al. | 501/66 |
| 3,647,406 | 3/1972 | Fisher | 65/30.13 |
| 3,773,487 | 11/1973 | Plumat et al. | 65/30.14 |
| 3,784,386 | 1/1974 | Araujo et al. | 501/37 |
| 3,790,430 | 2/1974 | Mochel | 501/66 |
| 3,827,785 | 8/1974 | Matsushita et al. | 501/37 |
| 3,853,674 | 12/1974 | Levene | 427/380 |
| 3,923,486 | 12/1975 | Kitano et al. | 65/3.14 |
| 3,941,474 | 3/1976 | Kitano et al. | 65/3.14 |
| 3,954,487 | 5/1976 | Gliemeroth et al. | 65/30.14 |
| 4,038,090 | 7/1977 | Gliemeroth | 501/64 |
| 4,099,834 | 7/1978 | Faulstich et al. | 501/37 |
| 4,166,745 | 9/1979 | Araujo et al. | 501/37 |
| 4,220,461 | 9/1980 | Samanta | 65/22 |
| 4,236,930 | 12/1980 | Macedo et al. | 501/66 |
| 4,290,793 | 9/1981 | Brockway | 65/30.14 |
| 4,367,012 | 1/1983 | Ikeda et al. | 501/37 |
| 4,375,312 | 3/1983 | Tangonan | 65/3.14 |
| 4,430,258 | 2/1984 | McFarland et al. | 252/644 |
| 4,452,508 | 6/1984 | Beales et al. | 501/66 |
| 4,462,663 | 7/1984 | Shimizu et al. | 350/413 |
| 4,472,030 | 9/1984 | Tachibana et al. | 501/37 |
| 4,526,874 | 7/1985 | Grabowski et al. | 501/66 |
| 4,562,161 | 12/1985 | Mennemann et al. | 501/66 |
| 4,565,791 | 1/1986 | Boudot et al. | 501/66 |
| 4,842,629 | 6/1989 | Clemens et al. | 65/30.13 |

FOREIGN PATENT DOCUMENTS

| | | |
|---|---|---|
| 1901053 | 1/1969 | Fed. Rep. of Germany . |
| 2939339 | 5/1980 | Fed. Rep. of Germany . |
| 57-007402 | 2/1982 | Japan . |
| 60-015607 | 1/1985 | Japan . |
| 62-283845 | 12/1987 | Japan . |
| 1284673 | 9/1972 | United Kingdom . |

OTHER PUBLICATIONS

Applied Optics, "Integrated optical waveguiding structures made by silver ion exchange in glass," vol. 22, No. 12, Jun. 15, 1983, pp. 1923–1928.
"Cäsium Natrium Ionenaustausch an Silicatgläsern," Giastechn. Ber. 54 (1981) Nr. 8, S. 243–246.
Izawa, Tatsuo and Nakagome, Hiroshi, "Optical Waveguide Formed by Electrically Induced Migration of Ions in Glass Plates", App. Phys. Lett., vol. 21, No. 12, Dec. 15, 1972, pp. 584–586.
Lilienhof, Hans-J.; Voges, Edgar; Ritter, Dittmar and Patnschew, Blagoy; "Field-Induced Index Profiles of Multimode Ion-Exchanged Strip Waveguides", IEEE Journal of Quantum Electronics, vol. QE-18, No. 11, Nov., 1982, pp. 1877–1883.
"Advanced Inorganic Chemistry", F. Albert Cotton et al., 2d edition, John Wiley & Sons (1966) p. 419.

Primary Examiner—Kenneth M. Schor
Assistant Examiner—John J. Bruckner
Attorney, Agent, or Firm—Wegner, Cantor, Mueller & Player

[57] ABSTRACT

A method of production of mono- or multimodal lightwave guides from special substrate glasses of the glass system $SiO_2$-$B_2O_3$-$Al_2O_3$- $K_2O$-$F^-$, with partial exchange of the $Li^+$, $Na^+$, and/or $K^+$ ions present in the glass against $Cs^+$ ions, the substrate glasses having the following compositions (in mol.-%): $SiO_2$ 45–72, $B_2O_3$ 8–25, $Al_2O_3$ 1–25, $Li_2O$ 0–1, $Na_2O$ 0–2, $K_2O$ 6–18, MO 0–1 (MO= MgO, CaO, SrO, BaO, ZnO, PbO), in which a portion of the $O^-$ ions present in the glass are replaced by 1–15 mol % $F^-$ ions.

6 Claims, 4 Drawing Sheets

FIG. I

REFRACTIVE INDEX PROFILES GENERATED BY ION EXCHANGE WITHIN GLASS FROM EXAMPLE 1, AT 441°C EXCHANGE TEMPERATURE AND EXCHANGE PERIODS OF 4, 8, 16 AND 24 HOURS.

FLATTENED OR DEEPENED REFRACTIVE INDEX PROFILES IN THE GLASS OF EXAMPLE 1, PRODUCED BY A SUBSEQUENT TEMPERING PROCESS

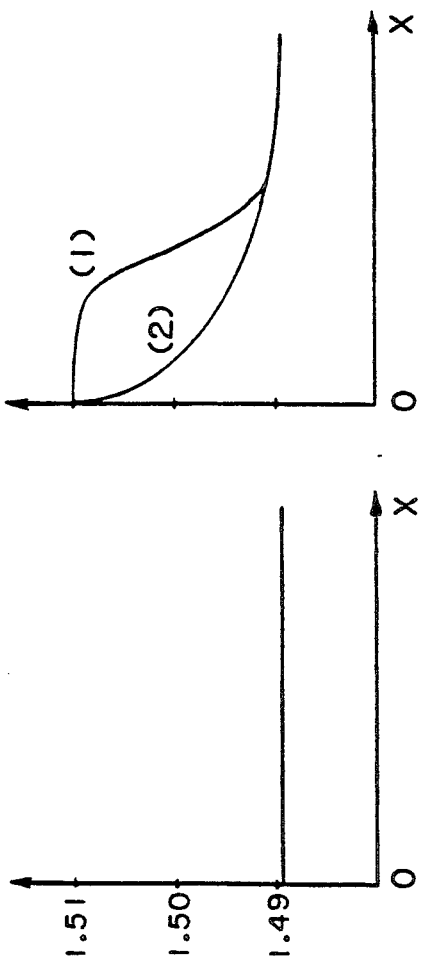
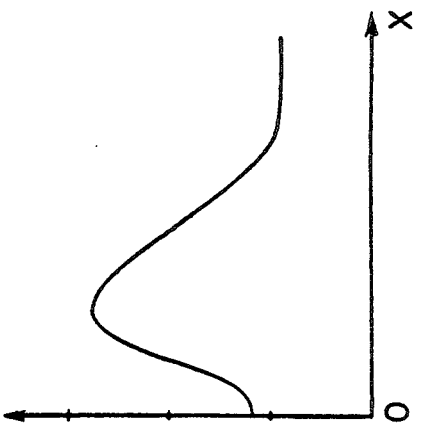
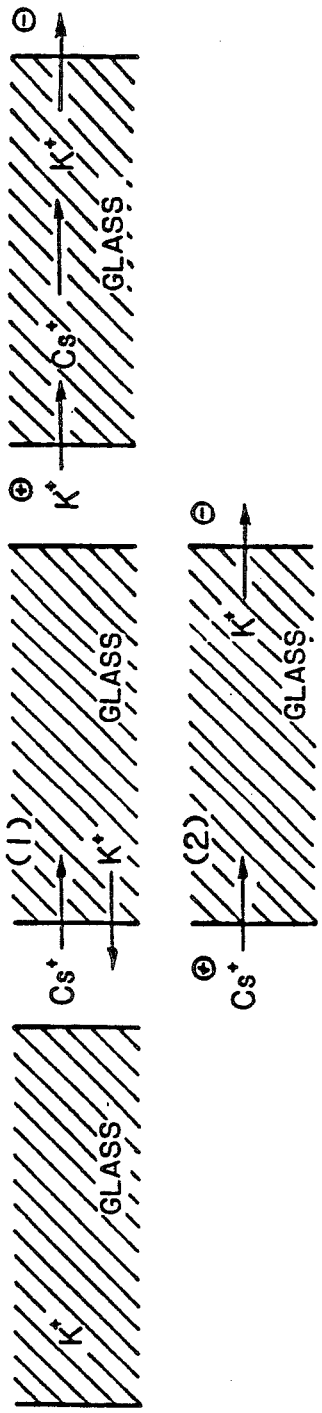
FIG. 3A — Substrate glass without exchange
FIG. 3B — Ion exchange in the $Cs^+$-salt bath with field (1) and without field (2)
FIG. 3C — Second ion exchange in the $K^+$-salt bath with field
MANUFACTURE OF BURIED LIGHT WAVE CONDUCTORS THROUGH REPEATED ION EXCHANGE SCHEMATIC REPRESENTATION OF AN 8 FOLD-WAVE CONDUCTOR AS EXAMPLE FOR A BAND WAVE CONDUCTOR.

LIGHTWAVE GUIDE PRODUCED BY ION EXCHANGE OF CS+ IONS

This application is a divisional of Ser. No. 07/437,295, filed Nov. 16, 1989, now U.S. Pat. No. 5,004,707, which is a continuation of Ser. No. 07/267,651, filed Nov. 1, 1988, abandoned, which is a continuation of Ser. No. 06/821,435, filed Jan. 22, 1986, abandoned.

DESCRIPTION OF THE INVENTION

1. Technical Field of the Invention

The invention relates to lightwave guides which are produced from special substrate glasses of the glass system $SiO_2/B_2O_3/Al_2O_3/K_2O/F^-$ by partial exchange of the alkali-ions present in the glass against $Cs^+$ ions.

2. Background Art

Today's state of the art is documented in numerous publications. A general review is provided by G. Steward in Journal of Non-Crystalline Solids 47: 191–200 (1982). According to this review, lightwave guides can be produced by ion-exchange from $Li_2O$-, $Na_2O$- or $K_2O$-bearing substrate-glasses. $Li^+$, $Na^+$, $K^+$, $Tl^+$ and $Ag^+$ are described as suitable exchangeable ions.

Lightwave guides which were produced by ion-exchange of these ions are described, e.g. in the following publications: E. Voges et al., IEEE Journal of Quant. Electr. QE-18: 1877 (1982); G. H. Chartier et al., Electronics Lett. 13: 763 (1977); T. Izawa, H. Nakagome, Appl. Phys. Lett. 21: 584 (1972); and R. G. Walker, C. D. W. Wilkinson, J. A. H. Wilkinson, Appl. Optics 22: 1923 (1983).

According to these publications, planar lightwave guides can be produced from glass by ion-exchange against the refractive index-increasing ions $Li^+$, $Ag^+$ and $Tl^+$. For substrate glass materials, commercially common window-glasses, microscope cover-glasses or other standard glasses are used. The production of lightwave guides from glass by ion-exchange against lithium involves problems because the $Li^+$ ion has a substantially smaller radius than the monovalent ions in the glass which are exchanged for lithium. Due to this factor, during cooling after ion-exchange, most glasses will show a collapse of the reticular structure, i.e. the glass surface is destroyed. If there is no actual destruction the wave guide will show very strong stress birefringence, which is disadvantageous in many applications. The increase in refractive index which is achievable by lithium ion exchange is, at $\Delta n = 0.015$, insufficient for many cases.

Lightwave guides which are produced by ion-exchange in silver-salt baths frequently display a siqnificantly reduced translucence in comparison with the non-ion-exchanged substrate glass body. This higher absorption is due to the instability of the monovalent silver ion at raised temperatures. At temperatures upwards of 250° C. the silver salt solutions, or baths, which are used break up and metallic silver is precipitated out of solution. If this decomposition takes place in the superficial layers of the substrate glass body, scattering centers are created which give rise to greater light losses. The high price of the silver salts constitutes a further drawback of this process.

Substrate glass bodies which have been ion-exchanged in fused thallium salt baths will produce lightwave guide of high quality. However, working with the notoriously highly toxic thallium compounds, especially at elevated temperatures of up to 600° C., entails serious difficulties. The detoxification of the washing solutions and used baths as well as the necessarily extensive protective measures demand high costs, endanger the operating staff and therefore render this process unsuitable for general production purposes. The process described in German PS 24 56 894 results in a lowering of the refractive index and is not suitable for making the lightwave guide here described.

So far it had not been possible to control the production of lightwave guide by ion-exchange against $Cs^+$ ions. Admittedly, there are publications describing a $Cs^+$ ion exchange, e.g. G. H. Frischat, H. J. Franek, Glastechn. Ber. 54: 243 (1981) but the exchange layers achieved in those cases were unsuitable for lightwave guides. Layers of adequate thickness for lightwave guides could be obtained only by application of very long exchange times or very high temperatures. Even so, the surfaces displayed corrosion traces of a depth of 2–3 $\mu m$ so that these layers were unfit for use as lightwave guides.

DISCLOSURE OF THE INVENTION

Accordingly, it is a general object of the present invention to provide a method for the economical production of lightwave guides.

Another object of the present invention is to provide such a method employing electrical field-assisted ion exchange wherein the refractive index profile obtained by $Cs^+$ ion exchange at the surface of a substrate glass body can be migrated into the glass interior.

Another object of this invention is to provide lightwave guides which exhibit good chemical stability and flawless optical properties.

Another object of this invention is to provide a process wherein the refractive index curve of such lightwave guides can be flattened.

A further object of this invention is to provide lightwave guides prepared by the aforementioned processes.

BRIEF DESCRIPTION OF THE DRAWINGS

Other objects, features, and advantages of the present invention will become more fully apparent to those skilled in the art to which this invention pertains from the following detailed description, taken in conjunction with the annexed drawings, wherein:

FIGS. 3A, 3B and 3C schematically illustrate the changes to the glass during repeated ion exchange according to the present invention.

DETAILED DESCRIPTION

The lightwave guides according to the invention were realized in glass system which was specifically developed for a $Cs^+$-ion exchange. These substrate glasses containing the main components $SiO_2$, $B_2O_3$, $Al_2O_3$, $K_2O$ and a partial substitution of the $O^-$ by $F^-$, allow, by ion-exchange in Cs-salt baths applying relatively low temperatures and exchange times, sufficiently thick layers to be produced with an increase in refractive index of up to n=0.05. The lightwave guides thus obtained show no significant increase in translucency losses by comparison with the substrate glass body because of the stability invention are essentially distinguished from hitherto used glasses in that a certain portion of $O^-$ ions has been replaced by $F^-$ ions. While not wishing to be bound by any theory of the invention, it is believed that the $F^-$ ions loosen up the reticular structure of the glass, making it easier for the relatively large $Cs^+$ ions to diffuse into the substrate glass body. The resulting lower exchange times and temperatures prevent an attack of the glass surface by the aggressive Cs-salt bath in fusion so that lightwave guides with a faultless surface structure are obtained. Since the ion-exchange can be carried out in the vicinity of the glass transformation temperature, stress-free lightwave guides can be obtained after slow cooling.

Substrate glasses suitable for use in the present invention are preferably those having the following composition (mol %):

| | |
|---|---|
| $SiO_2$ | 45-72 |
| $B_2O_3$ | 8-25 |
| $Al_2O_3$ | 1-25 |
| $Li_2O$ | 0-1 |
| $Na_2O$ | 0-2 |
| $K_2O$ | 6-18 |
| MO | 0-1 |
| (MO = MgO, CaO, SrO, BaO, ZnO, PbO) | |

Presently such glasses must contain 1-15 mol % $F^-$; those of the following composition are especially preferred:

| | |
|---|---|
| $SiO_2$ | 53-63 |
| $B_2O_3$ | 8-19 |
| $Al_2O_3$ | 5-20 |
| $K_2O$ | 12-18 |
| $F^-$ | 5-7.5 |
| $Na_2O + Li_2O$ | 0-2 |

The substrate glass can further contain up to 5 mol % of at least one oxide selected from the group consisting of $TiO_2$, $ZrO_2$, $P_2O_5$, $GeO_2$, $Y_2O_3$, $La_2O_3$, $Nb_2O_5$, $Ta_2O_5$, $WO_3$, $SnO_2$, $As_2O_3$, $Sb_2O_3$, and $Bi_2O_3$.

The substrate glasses are high in $K_2O$, with the $K_2O$ content being at least 80% of the $Al_2O_3$ content; preferably the molar ratio of $Al_2O_3:M_2O$ ($M_2O = Li_2O$, $Na_2O$, $K_2O$, $Cs_2O$) is about 0.8-1.2.

The materials used in the production of lightwave guides according to the invention do not have a high toxicity so that no added safety precautions are needed. By comparison with silver salt, the cesium salts are presently cheaper by a factor of 8-10.

Figure 1:
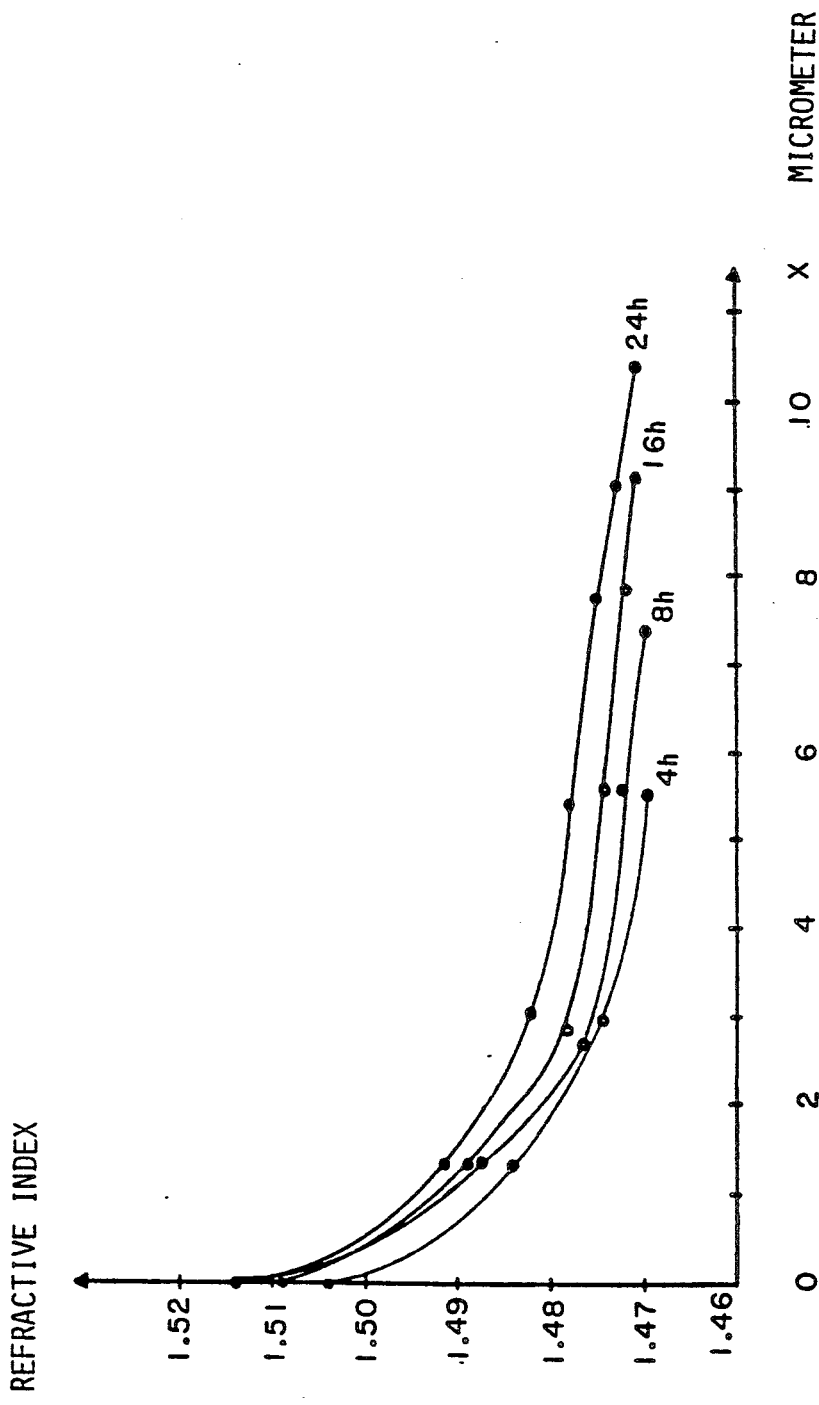
- FIG. 1 shows representative refractive index profiles generated by ion exchange.

The lightwave guides according to the invention have a wide range of application because their refractive index profile can be adapted to any given application. Maximum increase in refractive index is determined by exchange of the alkali ions in the substrate glass against the maximum possible Cs-concentration. In substrate glass bodies which have been subjected to ion-exchange treatment according to the invention, this may vary between 6 and 21 mol %. For a given alkali concentration in the glass the refractive index profile can be determined by ion-exchange parameters. In relation to exchange time, refractive index profiles similar to those shown in FIG. 1 are obtained.

Figure 2:
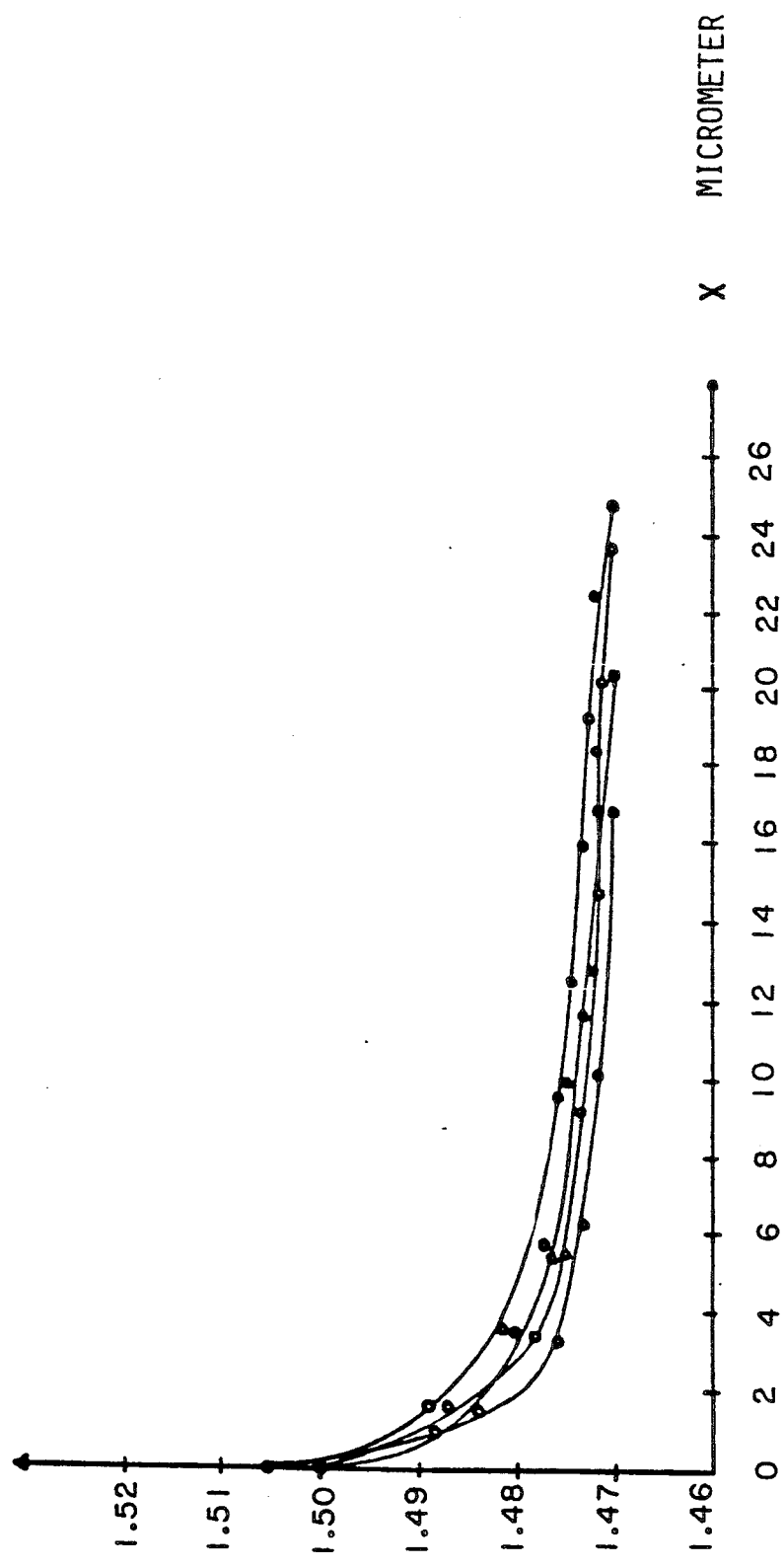
FIG. 2 shows flattened profiles of the same glass which were produced by a subsequent tempering process.

At 2 h exchange time a monomode lightwave guide is generally obtained, whilst for longer times multimode lightwave guides are produced. This shift from a monomode to a multimode lightwave guide is caused by a deeper penetration of $Cs^{30}$ ions and a deeper refractive index profile, which allows steeper propagation angles of lightwaves. As shown in FIG. 2, the refractive index profiles can be flattened or enhanced by application of a final tempering process.

A further provision which allows the deliberate shaping of the refractive index curve or profile resides in the application of field-assisted ion-exchange. Since the rate of diffusion increases strongly with the applied electrical field strength it is possible to achieve considerable reductions in respect of exchange temperature and time by field-assisted ion-exchange. Temperature reduction is limited by the relatively high fusion temperatures of the Cs-salts or eutectic compounds of different Cs-salts. Field-assisted ion-exchange offers the further option of making the refractive index profile which has been obtained by the $Cs^+$ ion exchange at the surface of the substrate glass body migrate into the glass interior. The steps needed for this purpose are illustrated in FIG. 3.

In the course of the first step an increase in refractive index is produced by ion-exchange in a Cs-salt bath, either with or without electrical field application. During a second ion-exchange in a K-salt bath the $Cs^+$ ions are subjected to an electrical force field and migrate into the glass interior; the $K^+$ ions follow from the fused bath and further lower the refractive index in the surface region of the substrate glass body.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever. In the following Examples, the temperatures are set forth uncorrected in degrees Celsius; unless otherwise indicated, all parts and percentages are by weight.

EXAMPLE 1

Planar Multi- or Monomode Lightwave Guides

Substrate glass of the following compositions (mol %): $SiO_2$ 59.3, $B_2O_3$ 18.0, $Al_2O_3$ 5.2, $K_2O$ 17.5, in which a portion of the $O^-$ ions are replaced by addition of 6.8% $F^-$ in the form of KF, is melted according to the conventional production method for optical glasses using a refining agent (0.2 weight %) such as $As_2O_3$, cast in moulds, cooled, and cut into glass plates 10 mm×20 mm×2 mm. These glass plates are polished until surface roughness is better $\lambda/10$ ($\lambda=500$ nm). The glass plates thus prepared are then suspended at 441° C. in a cesium nitrate melt for 2, 4, 8, 16 or 24 hours. After removal from the salt bath the glass plates are cooled at the rate of approximately 100°-200° C./h, the adherent salt is washed off in water, and the plates are dried. After polishing the end faces of the substrate glass body which must produce a sharp edge on the side of the waveconductor layer, these glass plates can be used as planar lightwave conductors. Their refractive index profiles are shown in FIG. 1.

EXAMPLE 2

Planar Strip Wave Guides

Substrate glass having the following composition (mol %): $SiO_2$ 54.2, $B_2O_3$ 18.5, $Al_2O_3$ 9.9, $K_2O$ 15.6, $Na_2O$ 1.4, $Li_2O$ 0.4, with a portion of the $O^-$ ions being replaced by an addition of 6.5% $F^-$ ions in the form of KF, is produced and prepared in the same way as the glass in Example 1.

Figure 4:
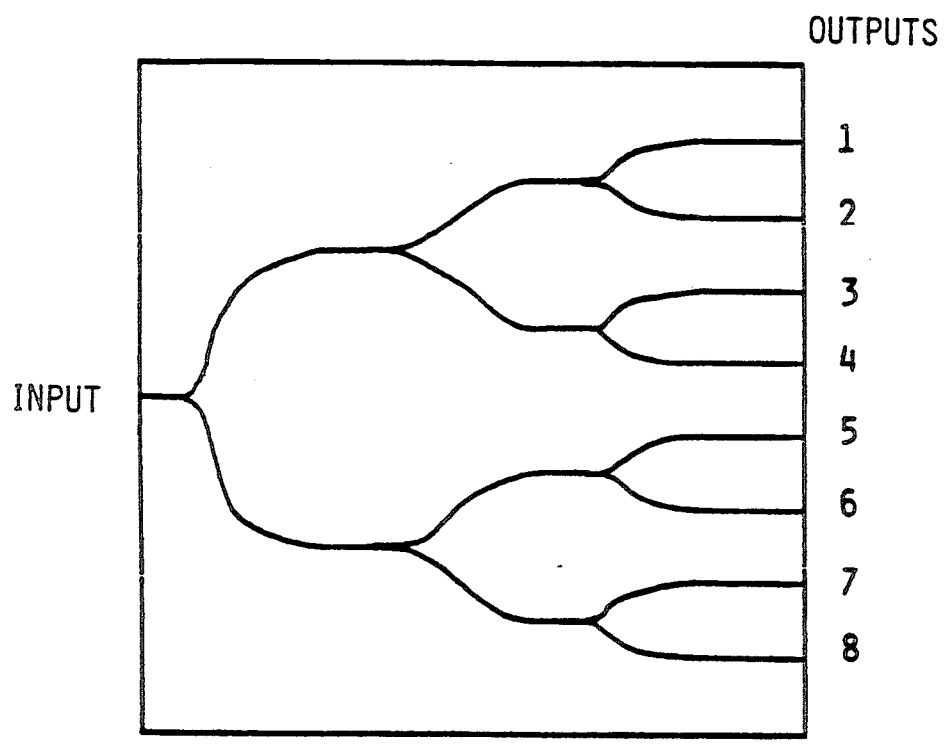
FIG. 4 is a schematic representation of an eight fold band wave conductor.

After polishing the surface of the substrate glass plate an approximately 200 nm thick Al-layer is applied by vapour deposition, coated with photo-lacquer and, in contact with a mask, thin strips from 3 to 5 μm wide are light-exposed. These strips may assume widely different structures, e.g. a 1:8 distributor shown schematically in FIG. 4. The photo-lacquer or film is developed after light exposure, which causes it to detach itself from the light exposed areas. The aluminum which is no longer covered by photo-lacquer is then removed by etching, the non-exposed photo-lacquer detached and, after cleaning and drying, the substrate glass plate is dipped in a salt bath consisting of 70 mol % $CsNO_3$ and 30 mol % CsCl at 395° C. for 2 hours. Further treatment is applied as in Example 1. In this way monomodal strip (straited) wave guides are obtained which, after coupling with corresponding light conductor fibres, can be used as couplers, distributors or similar components, depending on the mask.

EXAMPLE 3

Planar Buried Strip Wave Guides

Production proceeds initially as described in Example 1. After the first ion-exchange the Al-mask is detached and a second ion-exchange applied in which the two polished glass faces of the substrate glass plates are wetted by two relatively electrically insulated $KNO_3$-salt melts at 420° C. Pt electrodes which dip into the salt melts and an electrical voltage of 50 V are applied to both for about 30 minutes. After cooling, cleaning and drying stripwave guides are obtained wherein the structure is from 20 to 30 μm below the glass surface.

EXAMPLE 4

Planar Multi- or Monomode Lightwave Guides

Substrate glass of the following compositions (mol %): $SiO_2$ 62.90 $B_2O_3$ 12.0, $Al_2O_3$ 12.5, $K_2O$ 12.5, with a portion of the $O^-$ ions being replaced by addition of 6.26% $F^-$ in the form of $AlF_3$, is melted in accordance with the conventional method of producing optical glasses using a refining agent (0.2 w %) such as $As_2O_3$, cast in moulds and after cooling cut into glass plates 10 mm×20 mm×2 mm. These glass plates are polished until surface roughness is better $\lambda/10$ ($\lambda=500$ nm). The glass plates thus prepared are then suspended at 436° C. in a cesium salt melt for 2, 4, 8, 16 or 24 hours. After removal from the salt bath the glass plates are cooled at the rate of approximately 100°–200° C./h, the adhering salt residue washed off in water, and dried. After polishing the end faces of the substrate glass body which must produce a sharp edge on the side of the waveconductor layer, these glass plates can be used as planar lightwave conductors. Their refractive index profiles are shown in FIG. 1.

The substrate glasses according to this example are distinguished from the glasses according to Examples 1–3 in that they have a higher $Al_2O_3$ content. This higher $Al_2O_3$ content promotes diffusion particularly with high alkali contents, so that ion-exchange times are reduced or better diffusion depths can be achieved for similar times. Moreover, the higher $Al_2O_3$ content causes further stabilization against chemical aggression by the ion-exchange bath or the etching solution used in the structuring process so that lightwave guides with a flawless surface structure are readily obtained.

EXAMPLE 5

Planar Stripwave Guides

Substrate glass having the following composition (mol %): $SiO_2$ 53.5, $B_2O_3$ 8.03, $Al_2O_3$ 19.5, $K_2O$ 18.0, $Na_2O$ 1.0, in which a portion of the $O^-$ ions being replaced by an addition of 7.22% $F^-$ ions in form of $AlF_3$ is produced and prepared in the same way as the glass in Example 4.

After polishing the surface of the substrate glass plate an approximately 200 nm thick Ti-layer is applied by vapour deposition, coated with photo-lacquer and, in contact with a mask thin strips from 3 to 5 μm wide are light-exposed. These strips may assume widely different structures, e.g. a 1:8 distributor of the kind represented schematically in FIG. 4. After light exposure, the photo-lacquer or film is developed, causing it to detach itself from the light exposed areas. Then the aluminum which is no longer covered by photo-lacquer is removed by etching, the non-exposed photo-lacquer detached and, after cleaning and drying, the substrate glass plate is dipped in a salt bath consisting of 70 mol % $CsNO_3$ and 30 mol % CsCl at 395° C. for two hours. Further treatment is applied as in Example 4. In this fashion monomodal stripwave guides are obtained which, after coupling with corresponding light conductor fibers, may be used as couplers, distributors or similar components, depending on the mask used.

EXAMPLE 6

Planar Buried Stripwave Guides

Production proceeds initially as described in Example 5 but with Al-masking. After the first ion-exchange the Al-mask is detached and a second ion-exchange applied in which the two polished glass faces of the substrate glass plates are wetted by two relatively electrically insulated $KNO_3$-salt melts at 420° C. An electrical voltage of 50 V is applied for about 30 minutes to the two platinum electrodes which dip into the salt melts. After cooling, cleaning and drying, stripwave guides are obtained which have their structure 20 to 30 μm below the glass surface.

The preceding examples can be repeated with similar success by substituting the generically or specifically described reactants and/or operating conditions of this invention for those specifically used in the examples. From the foregoing description, one skilled in the art to which this invention pertains can easily ascertain the essential characteristics thereof and, without departing from the spirit and scope of the present invention, can make various changes and modifications to adapt it to various usages and conditions.

What is claimed is:

1. A method of producing a lightwave guide which comprises contacting a substrate glass body consisting essentially of the following composition, in mol %:

| | |
|---|---|
| $SiO_2$ | 45–72 |
| $B_2O_3$ | 8–25 |

-continued

| | |
|---|---|
| Al$_2$O$_3$ | 1–25 |
| Li$_2$O | 0–1 |
| Na$_2$O | 0–2 |
| K$_2$O | 6–18 |
| MO | 0–1 | wherein MO=MgO, CaO, SrO, BaO, ZnO, PbO, having a polished or fire-polished surface, with F$^-$ ions to replace a portion of the O$^{2-}$ ions present in the glass by 1–15 mol % F$^-$ ions, followed by contacting the substrate glass body with a Cs-salt melt at an elevated temperature for a period of time sufficient to produce a lightwave conducting zone by incorporating Cs$^+$ ions into the substrate glass body by an ion-exchange of K$^+$, Li$^+$, and/or Na$^+$ ions against Cs$^+$ ions to effect a refractive index gradient within the glass.

2. A method according to claim 1 wherein the ion exchange effected in the presence of an applied electrical field.

3. A method according to claim 2 wherein the refractive index profile which has been obtained by Cs$^+$ ion exchange at the surface of the substrate glass body is migrated into the glass interior.

4. A method according to claim 1 further comprising a second ion exchange treatment by contacting the glass with a fused salt melt containing Na$^+$ and/or K$^+$ ions, optionally in the presence of an applied electric field, so that Cs$^+$ ions migrate further into the glass interior and K$^+$ and/or Na$^+$ ions from the salt melt follow them into the surface of the lightwave-conducting zone.

5. A method according to claim 1 wherein any desired lightwave guide structures are produced by masking the glass surface prior to the ion exchange process.

6. In a method of using a lightwave guide as an integrated optical component in optical signal or data transmission, the improvement wherein the lightwave guide is produced according to the method of claim 1.

* * * * *